May 18, 1948.  E. M. FRY  2,441,808
REMOTE CONTROL MECHANISM
Filed March 8, 1946  2 Sheets-Sheet 1

INVENTOR
E. M. FRY
BY
J. MacDonald
ATTORNEY

May 18, 1948.   E. M. FRY   2,441,808
REMOTE CONTROL MECHANISM
Filed March 8, 1946   2 Sheets-Sheet 2
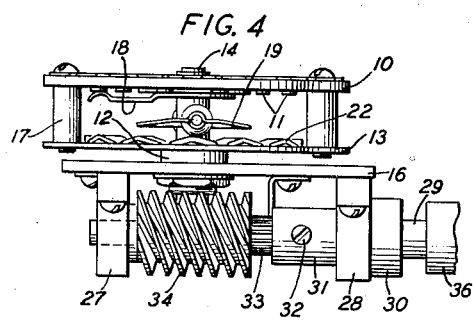
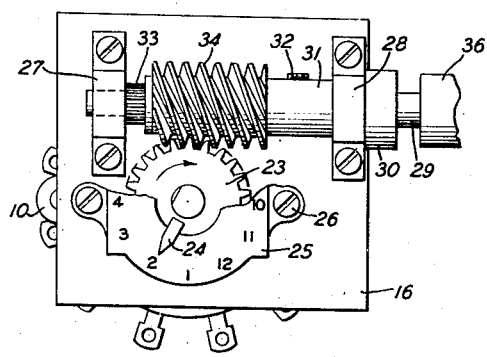
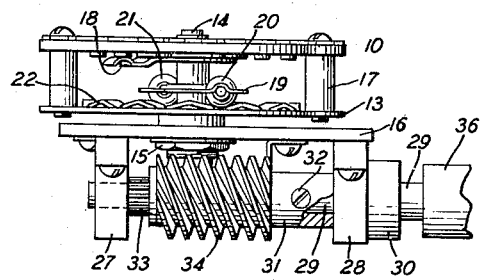
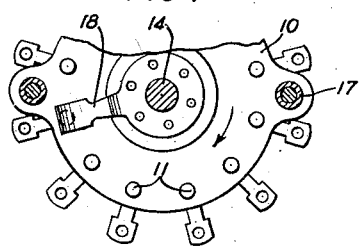
INVENTOR
E. M. FRY
BY J. MacDonald
ATTORNEY Patented May 18, 1948

2,441,808

UNITED STATES PATENT OFFICE 2,441,808

REMOTE CONTROL MECHANISM

Eugene M. Fry, Summit, N. J., assignor to Bell Telephone Laboratories, Incorporated, New York, N. Y., a corporation of New York Application March 8, 1946, Serial No. 653,084

4 Claims. (Cl. 200—11)

This invention relates to remote control devices and more specifically to a type of remote control which is particularly well adapted for use for operating a so-called self-centering multielectric switch and like apparatus in a manner to accurately position the wiper of such a switch step-by-step on its associated contacts.

In self-centering switches as it is well-known, a so-called star or cam wheel and spring-pressed rollers riding on the star wheel are provided for assisting the operator of the switch to successively position the wiper of the switch on its contacts, the positioning of such a wiper being generally indicated by a dial and pointer carried by a handle or knob keyed onto the switch shaft which supports the wiper of the switch.

In the operation of switching devices of the self-centering type by manually operated remote control, as by the use of a flexible shaft, the applicant discovered that the torsional tension stored in the flexible shaft during the movement of the wiper and the simultaneous tensioning of the detent spring so as to force the rollers carried thereby over the apex of two diametrically disposed teeth or cams of the star wheel in the centering mechanism produced an overthrow movement of the wiper of the switch beyond the position of the desired or selected contact.

The object of the present invention is the provision of a control device for electrical switching and the like apparatus which will be simple, convenient to operate and positive in operation.

In the drawing,

Fig. 4 is a top view showing the switch in the position indicated by the dial in Fig. 3;

Figure 2:
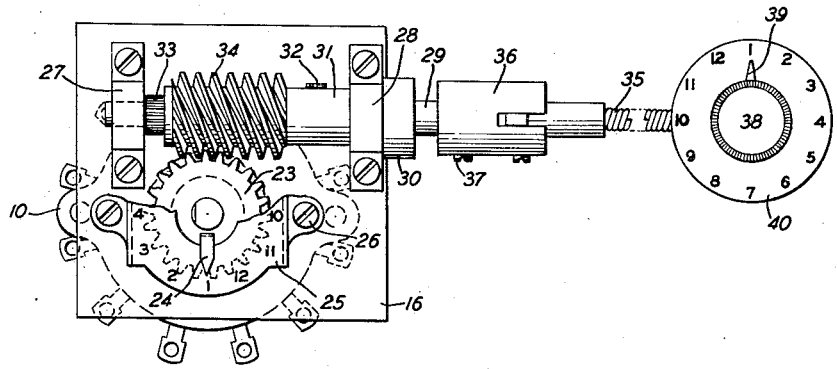
Fig. 2 is a front elevation view shown with the operating parts in normal position.
Figure 3:
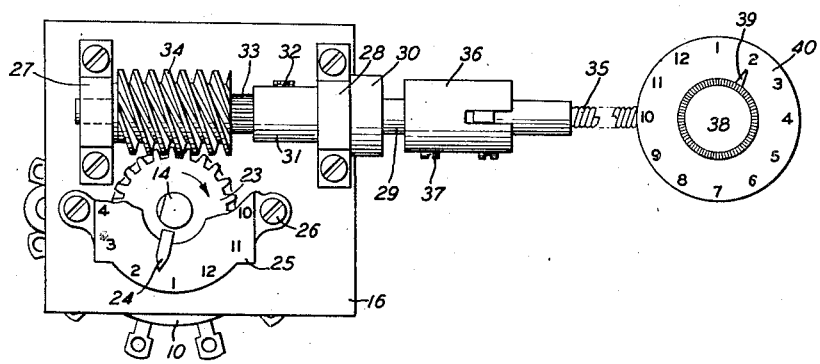
Fig. 3 is a view similar to that of Fig. 2 but showing the switch partially operated.

Fig. 5 is a view similar to that of Figs. 2 and 3 but showing the switch operated from the position 1 to the position 2;

Fig. 6 is a top view of Fig. 5; and

Figure 1:
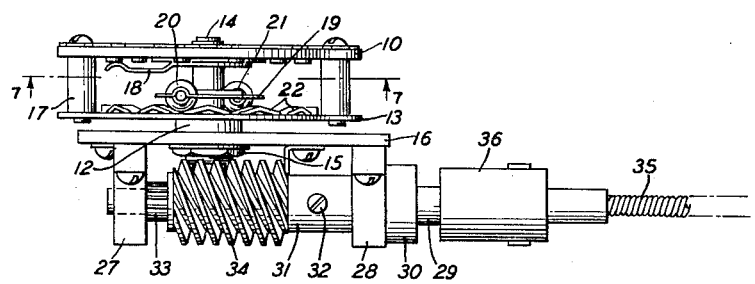
Fig. 1 is a top assembly view shown with the operating parts in normal position but with the flexible shaft shown with a portion broken away.

Fig. 7 is a partial view shown in vertical section taken on line 7—7 of Fig. 1.

As shown in the drawing, the switching device to which the remote control of this invention is particularly well adapted for use, consists of an insulating plate 10 on which the contacts 11 are mounted in a circular row, the insulating plate 10 in cooperation with a bushing 12 secured to a metallic plate 13 serving for pivotally supporting a shaft 14 while a nut 15 serves for securing a third plate 16 in assembled relation with the metallic plate 13, spacer members 17 being provided for securing the metallic plate 13 and the insulating plate 10 in adjusted spaced relation to each other as shown in Figs. 4, 6 and 7.

On one end of shaft 14 is securely mounted a wiper 18 provided for successively engaging the contacts 7 upon the rotation of shaft 13 in a manner which will be hereinafter described in detail. Onto the shaft 14 is keyed a double armed spring member 19 to the free end of which are mounted the rollers 20 and 21 engaging a star or camming ring 22 under the tension of their respective supporting spring arms to serve for automatically positioning the wiper 18 in centered relation on the contacts 11 upon the step-by-step movement of shaft 14.

According to the present invention a worm gear 23 best seen in Figs. 2, 3 and 5 is keyed on the end of shaft 14 and carries an index 24 movable in juxtaposition to the face of a dial 25 secured to the mounting plate 16 by a pair of screws 26. On the plate 16 are secured the bearings 27 and 28 provided for rotatably supporting a shaft 29, this shaft being held from longitudinal movement by a collar 30 formed with the shaft and a collar 31 secured thereon as by a set screw 32.

Shaft 29 is provided with a spline portion 33 on which a worm 34 is slidably mounted. This worm engages with the worm gear 23 for rotating the latter and thereby the double armed spring member 19 and wiper 18 upon the operation of a flexible shaft 35, best seen in Figs. 1, 2 and 3 connected at one end to the shaft 29, by a sleeve 36 secured to the shaft 29, as by a set screw 37, while to the opposite end of flexible shaft 35 is keyed a handle or knob 38 shown in Figs. 2 and 3 having an index 39 movable in juxtaposition to the face of a dial 40 numbered according to the position of the contacts 11 on plate 10 and according to the numerical order of dial 25.

In an example of the operation of the switching device above described by the remote control mechanism of the present invention, the rotation of knob 38 and thereby that of index 39 and the flexible shaft 35 is effective to impart a rotary movement to the shaft 29 and to the worm 34. The rotation of this worm, however, is ineffective to rotate the worm gear 23 during its longitudinal movement on the shaft 29 from the position shown in Figs. 1 and 2 to the position shown in Figs. 3 and 4, that is, in abutment against the bearing 27 due to the relatively high torque required for moving the wiper 18 and the spring-pressed rollers 20 and 21 onto the cams of ring 22. The continued rotation of worm 34 by knob 38 as above described causes the flexible shaft 35 to store sufficient tension so as to rotate the worm gear 23 and the spring-pressed rollers 20—21 from the position shown in Fig. 1 to the position shown in Fig. 4, when the index 39 indicates the position of the wiper 18 on the desired or selected contact and the rollers 20 and 21 in position, a small angular distance beyond the apex of two diametrically opposite cams in the ring 22 as shown in Fig. 4 to cause the operation of the detent for positioning the wiper on the contact corresponding to that determined by two diametrically disposed cams in the ring 22 which is indicated by the index 39 on dial 40 as shown in Fig. 2 while the index 24 is in position shown in Fig. 3 due to the tension stored in the flexible shaft 35.

The operation of shaft 14 is imparted by the spring-pressed rollers 20 and 21 on the cam of ring 22 and thereby the rotation of worm gear 23 for positioning the wiper 18 on contact No. 2 causing the worm gear to impart a sliding longitudinal movement to the worm 34 to normal position, that is, from the position shown in Fig. 4 to the positions shown in Figs. 5 and 6, thus compensating for the angular movement due to the torsional tension stored in the flexible shaft ineffective to cause the so-called overthrow of the wiper beyond the desired contact by the tension of the flexible shaft, while permitting the free operation of the detent mechanism thus constructed for the accurate positioning of the wiper on the contact, the movement of the worm 34 from the position shown in Fig. 4 to normal position shown in Figs. 1 and 2 preparing the remote control mechanism for a successive operation of the switch which may be effected either clockwise or counterclockwise as the case may be.

What is claimed is:

1. In a remote control mechanism for the operation of a switching device having a wiper and a plurality of contacts disposed in a row and a detent mechanism for successively centering the wiper on the contacts of the switch, said remote control comprising a flexible shaft, a worm, means operatively connecting said flexible shaft to said worm, said worm being capable of longitudinal and rotary movement, a worm gear disposed in engageable relation with said worm for actuating the wiper of the switch following a longitudinal movement of said worm by a predetermined movement of said flexible shaft preparatory to the operation of said worm gear for operating the centering mechanism and the wiper of the switch on a contact, the movement of the wiper by the centering mechanism being effective to impart a longitudinal movement to said worm to return the latter to normal longitudinally for taking up the torsional tension of said flexible shaft during the continued rotation of said worm gear to a successive position relative to the contact.

2. In a remote control mechanism for successively moving an element of a switch relative to another element in the switch, the first-mentioned element having a detent device, said remote control mechanism comprising a flexible shaft, a worm gear mounted for movement with the element of the switch, a shaft operatively connected to said flexible shaft, a worm mounted for rotation with the second mentioned shaft but capable of longitudinal movement thereon and engaging said worm gear, means for controlling the longitudinal movement of said worm upon its rotation by the movement of said flexible shaft to cause the rotation of the other element of the switch, said detent device operating upon the predetermined movement of said worm for returning the latter to normal longitudinally whereby the torsional tension stored in said flexible shaft is rendered ineffective to impart an overthrow movement to the movable element of the switch relative to the other element.

3. A remote control mechanism used for operating a switching device having a shaft, a plurality of contacts and a wiper mounted on the shaft movable step-by-step on the contacts and a detent mechanism consisting of a series of cams arranged in a row and spring-pressed means co-operating with the cams for centering the wiper on the contacts, the improvement which consists of a worm gear mounted on the shaft supporting the wiper of the switching device, a mounting having a pair of bearings, a shaft journaled in said bearings, a worm rotated by said shaft and capable of longitudinl movement thereon, a flexible shaft operatively connected to the last-mentioned shaft for rotating said worm to cause its longitudinal movement on said shaft but ineffective relative to said worm gear, means for stopping the longitudinal movement of said worm to render the rotation of the latter effective relative to said worm gear for moving the wiper of the switching device and tensioning the spring of the centering device by its movement over the cams to cause the spring in cooperation with two engaged cams to position the wiper of the switch on one of the contacts, the operation of the wiper and the worm gear imparting a longitudinal return movement of said worm to take up the torsional movement of said flexible shaft due to the tension stored therein during the manual operation of said wiper and the tension of the spring in the detent mechanism.

4. A remote control mechanism for the operation of a multicontact switching device having a star wheel and a spring-pressed roller engaging the star wheel for successively centering the wiper of the switch on the contacts, the improvement in such mechanism consisting of a worm gear keyed on the shaft supporting the wiper of the switch, a support, a worm mounted for rotation and longitudinal predetermined movement on the support, a flexible shaft having one of its ends operatively connected to said worm, a handle secured to the other end of said flexible shaft for rotating the latter, the movement of said flexible shaft causing said worm to move longitudinally ineffective relative to said worm gear and to rotate the latter following such longitudinal movement for moving said wiper and tensioning said spring by the movement of the roller on the tooth of said star wheel for permitting the automatic movement of the wiper of the switch onto a contact, the movement of the wiper being effective to impart longitudinal movement to said worm for returning the latter to normal position for preventing the overthrow of the wiper relative to the selected contact.

EUGENE M. FRY.

REFERENCES CITED

The following references are of record in the file of this patent:

UNITED STATES PATENTS

| Number | Name | Date |
| --- | --- | --- |
| 715,975 | Carichoff | Dec. 17, 1902 |